US008924386B2

(12) United States Patent
Matsubara et al.

(10) Patent No.: US 8,924,386 B2
(45) Date of Patent: Dec. 30, 2014

(54) DATA DISTRIBUTING APPARATUS, DATA STORING DEVICE, AND RECORDING MEDIUM

(75) Inventors: Masazumi Matsubara, Kawasaki (JP); Shinji Kikuchi, Kawasaki (JP); Fumi Iikura, Kawasaki (JP); Atsuji Sekiguchi, Kawasaki (JP); Yuji Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 13/176,969

(22) Filed: Jul. 6, 2011

(65) Prior Publication Data

US 2012/0054251 A1 Mar. 1, 2012

(30) Foreign Application Priority Data

Sep. 1, 2010 (JP) ................................. 2010-196191

(51) Int. Cl.
 *G06F 17/30* (2006.01)
(52) U.S. Cl.
 CPC .... *G06F 17/30339* (2013.01); *G06F 17/30575* (2013.01)
 USPC .......................................................... 707/736
(58) Field of Classification Search
 None
 See application file for complete search history.

(56) References Cited

U.S. PATENT DOCUMENTS

| 7,412,462 | B2 * | 8/2008 | Margolus et al. ...................... 1/1 |
| 7,480,719 | B2 * | 1/2009 | Inoue ............................. 709/226 |
| 7,536,386 | B2 * | 5/2009 | Samji et al. ........................... 1/1 |
| 7,557,694 | B1 * | 7/2009 | Graham ........................ 340/438 |
| 8,285,681 | B2 * | 10/2012 | Prahlad et al. ................. 707/640 |
| 8,407,190 | B2 * | 3/2013 | Prahlad et al. ................. 707/692 |
| 2004/0193673 | A1 * | 9/2004 | Samji et al. .................... 709/200 |
| 2005/0033777 | A1 * | 2/2005 | Moraes et al. ................. 707/202 |
| 2006/0059206 | A1 | 3/2006 | Ushijima et al. |
| 2010/0250535 | A1 * | 9/2010 | Loftus et al. ................... 707/736 |
| 2010/0332818 | A1 * | 12/2010 | Prahlad et al. ................. 713/150 |
| 2012/0173822 | A1 * | 7/2012 | Testardi et al. ................ 711/135 |

FOREIGN PATENT DOCUMENTS

| JP | 9-218858 | 8/1997 |
| JP | 2001-236256 | 8/2001 |
| JP | 2002-244556 | 8/2002 |
| JP | 2005-141436 | 6/2005 |
| JP | 2005-310126 | 11/2005 |
| JP | 2006-85208 | 3/2006 |
| JP | 2007-164266 | 6/2007 |
| JP | 2007-219634 | 8/2007 |
| JP | 2008-181270 | 8/2008 |

OTHER PUBLICATIONS

Japanese Office Action mailed Apr. 1, 2014, in corresponding Japanese Patent Application No. 2010-196191.

* cited by examiner

*Primary Examiner* — Debbie Le
(74) *Attorney, Agent, or Firm* — Staas & Halsey LLP

(57) ABSTRACT

A data distributing apparatus for distributing data having a plurality of data items to a plurality of data database devices, the data distributing apparatus includes a storing unit configured to store exclusive information indicating that two or more data items among the plurality of data items are not placed in the same database device among the plurality of data database devices, a placement deciding unit configured to decide a placement of the data items so that the two or more data items are placed in different data database devices among the plurality of database devices, and a request processing unit configured to transmit the plurality of data items to the plurality of data database devices according to the decided placement.

10 Claims, 26 Drawing Sheets

FIG. 3

| DATABASE DEVICE NAME | PROPERTIES |
|---|---|
| A | OPERATING RATE : 99.95%, PERFORMANCE : 5, COST : $0.20/GB, CAPACITY : MAX 100GB |
| B | OPERATING RATE : 98.9%, PERFORMANCE : 8, COST : $0.15/GB, CAPACITY : MAX 300GB |
| C | OPERATING RATE : 98.0%, PERFORMANCE : 10, COST : $0.10/GB, CAPACITY : MAX 2TB |

402
- CREATING REPLICA IN PLURALITY OF DBs IF DB HAVING OPERATING RATE LOWER THAN 99% IS USED
- COST EFFECTIVENESS

403

```
CREATE TABLE CLIENT INFORMATION (
    CLIENT ID           CHARACTER(20)   UNIQUE, NOT NULL, MUTEX(1),
    CLIENT NAME         CHARACTER(20)   NOT NULL, MUTEX(1),
    BIRTH DATE          DATE            MUTEX(2),
    ASSETS              INTEGER,
    FAMILY STRUCTURE    INTEGER         MUTEX(2),
    PREMIUM             INTEGER,
    CLASSIFICATION      INTEGER,
    PRIMARY KEY (CLIENT ID)
);
```

| CLIENT ID | CLIENT NAME | BIRTH DATE | ASSETS | FAMILY STRUCTURE | PREMIUM | CLASSIFICATION |
|---|---|---|---|---|---|---|
| 1 | AI | 1988.8.8 | 1500 | 3 | 1.5 | A |
| 2 | UE | 1999.9.9 | 500 | 2 | 2.0 | B |
| 3 | OKA | 1977.7.7 | 3000 | 5 | 3.0 | B |

404

405

COLUMN NAME ASSOCIATION TABLE

| ORIGINAL NAME | NAME AFTER BEING CHANGED |
|---|---|
| DB A KEY | A. Foo. A |
| DB B KEY | B. Bar. $\alpha$ |
| DB C KEY | C. Baz. I |
| CLIENT ID | A. Foo. B |
| CLIENT NAME | B. Bar. $\gamma$, C. Baz. II |
| BIRTH DATE | A. Foo. C |
| ASSETS | A. Foo. D |
| FAMILY STRUCTURE | B. Bar. $\beta$, C. Baz. III |
| PREMIUM | A. Foo. E |
| CLASSIFICATION | A. Foo. F |

F I G. 7

ROW ASSOCIATION TABLE 406

| DB A KEY | DB B KEY | DB C KEY |
|---|---|---|
| XYZ | 324 | w4t |
| AFG | 67 | r5rty |
| FRG | 234 | asdf |

F I G. 8

TABLE Foo

407

| A | B | C | D | E | F |
|---|---|---|---|---|---|
| XYZ | 1 | 1988.8.8 | 1500 | 3.0 | B |
| AFG | 2 | 1999.9.9 | 500 | 2.0 | A |
| FRG | 3 | 1999.7.7 | 3000 | 1.5 | B |

FIG. 9A

TABLE Bar                    408

| α | β | γ |
|---|---|---|
| 324 | 3 | AI |
| 67 | 2 | UE |
| 234 | 5 | OKA |

F I G. 9 B

TABLE Baz 409

| I | II | III |
|---|---|---|
| w4t | AI | 3 |
| r5rty | UE | 2 |
| asdf | OKA | 5 |

F I G. 9 C

TABLE Foo                                                410

| A | B | C | D | E | F |
|---|---|---|---|---|---|
| XYZ | 1 | 1988. 8. 8 | 1500 | 3. 0 | B |
| FRG | 3 | 1999. 7. 7 | 3000 | 1. 5 | B |
| AFG | 2 | 1999. 9. 9 | 500 | 2. 0 | A |

F I G. 9 D

TABLE Bar                                411

| α   | β | γ   |
|-----|---|-----|
| 234 | 5 | OKA |
| 324 | 3 | AI  |
| 67  | 2 | UE  |

F I G. 9 E

TABLE Baz 412

| I | II | III |
|---|---|---|
| w4t | AI | 3 |
| asdf | OKA | 5 |
| r5rty | UE | 2 |

FIG. 9F 413-1

| COLUMN NAME | ACCESS FREQUENCY | DATA AMOUNT |
|---|---|---|
| B | 500,000 ACCESSES/DAY | 10 GB |
| C | 300,000 ACCESSES/DAY | 15 GB |
| D | 450,000 ACCESSES/DAY | 150 GB |
| E | 150,000 ACCESSES/DAY | 10 GB |
| F | 150,000 ACCESSES/DAY | 10 GB |

FIG. 10A 413-2

| COLUMN NAME | ACCESS FREQUENCY | DATA AMOUNT |
|---|---|---|
| β | 30,000 ACCESSES/DAY | 10 GB |
| γ | 800,000 ACCESSES/DAY | 80 GB |

F I G.  1 0 B 413-3

| COLUMN NAME | ACCESS FREQUENCY | DATA AMOUNT |
|---|---|---|
| II | 800,000 ACCESSES/DAY | 80 GB |
| III | 30,000 ACCESSES/DAY | 10 GB |

F I G. 1 0 C

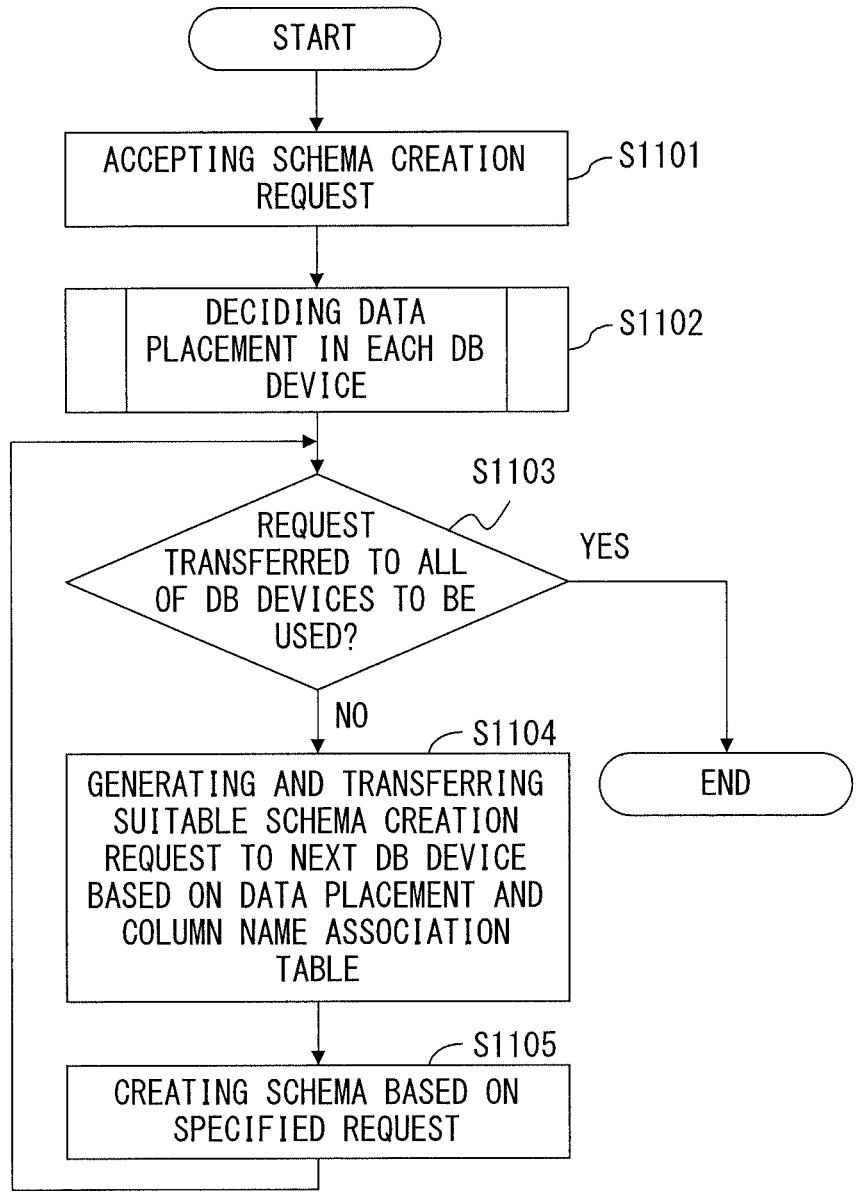
F I G. 1 2

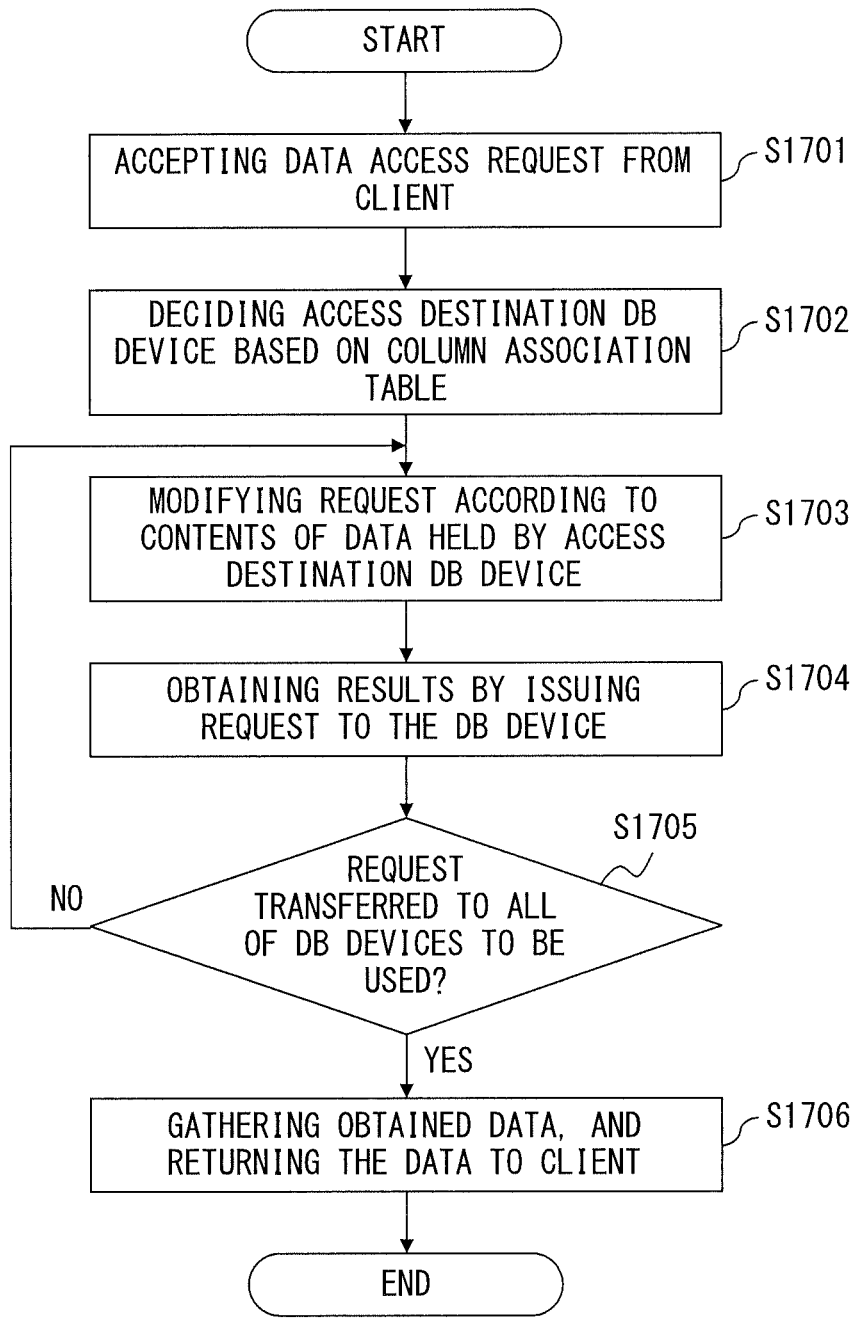
F I G. 1 8

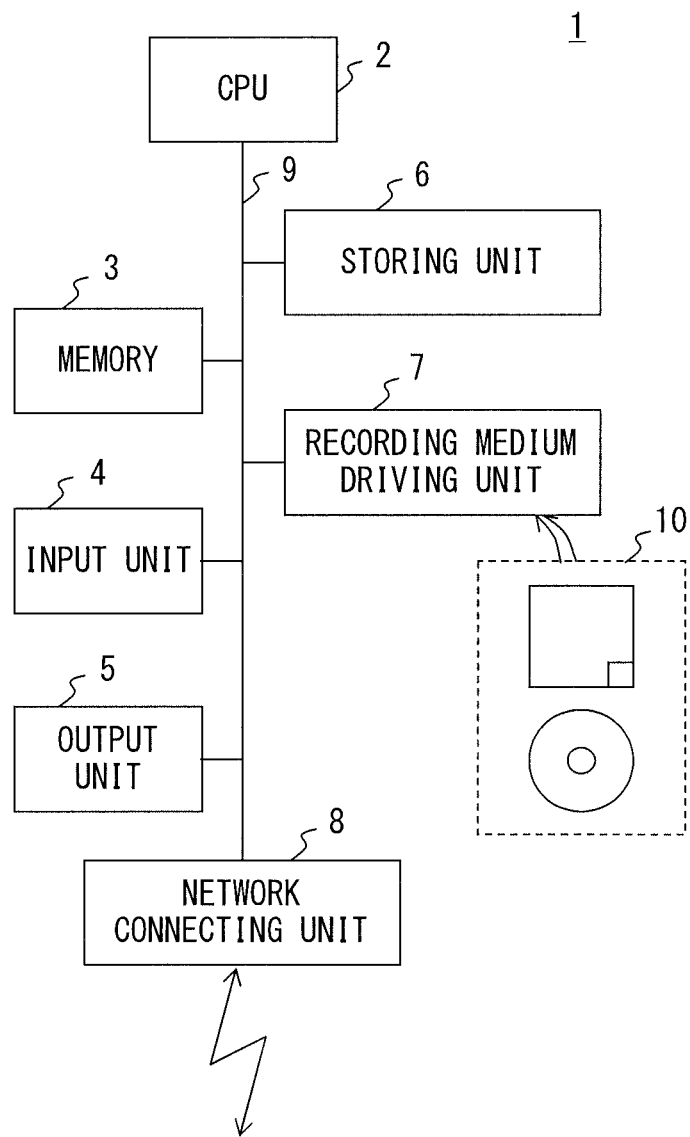
F I G. 19

DATA DISTRIBUTING APPARATUS, DATA STORING DEVICE, AND RECORDING MEDIUM

CROSS-REFERENCE TO RELATED APPLICATION

This application is based upon and claims the benefit of priority of the prior Japanese Patent Application No. 2010-196191, filed on Sep. 1, 2010, the entire contents of which are incorporated herein by reference.

FIELD

The embodiments discussed herein are related to a data distributing apparatus for distributing data in a distributed database, a data storing device for storing data in a database device, and a recording medium.

BACKGROUND

Currently, distributed databases are used to improve scalability and availability in database technology.

A distributed database is a technique for distributing and placing data in a plurality of computers connected to a network, and for making a plurality of databases included in the plurality of computers look like a single database.

However, if data is distributed by using only a highly reliable data center (such as an on-premise or a private cloud) when a distributed database is built, this poses a problem of increasing cost.

There are also a problem that a considerable amount of time is needed to encrypt/decrypt data when the data is distributed and placed after being encrypted with the use of a secrecy distribution technique, and a problem that a plurality of pieces of distributed information are needed to decrypt the data.

[Patent Document 1] Japanese Laid-open Patent Publication No. 2006-85208

[Patent Document 2] Japanese Laid-open Patent Publication No. 2007-219634

[Patent Document 3] Japanese Laid-open Patent Publication No. 2005-141436

SUMMARY

According to an aspect of the present invention, a data distributing apparatus for distributing data having a plurality of data items to a plurality of data database devices, the data distributing apparatus includes: a storing unit configured to store exclusive information indicating that two or more data items among the plurality of data items are not placed in the same database device among the plurality of data database devices; a placement deciding unit configured to decide a placement of the data items so that the two or more data items are placed in different data database devices among the plurality of database devices based on the exclusive information; and a request processing unit configured to transmit the plurality of data items to the plurality of data database devices according to the decided placement.

According to an another aspect of the present invention, a data storing device includes: a storage configured to store data having a plurality of rows; and a processor configured to generate a unique key corresponding to each of the rows of the data, to store, in the storage, data that makes an association between the key and each of the rows of the data, to shuffle the rows of the stored data, and to store the shuffled data in the storage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of property information of database devices;

FIG. 4 illustrates an example of data placement policies;

FIG. 5 illustrates an example of a schema;

FIG. 6 illustrates an example of registration data;

FIG. 7 illustrates an example of a column name association table;

FIG. 8 illustrates an example of a row association table;

FIG. 9A illustrates an example of data registered to a database device A;

FIG. 9B illustrates an example of data registered to a database device B;

FIG. 9C illustrates an example of data registered to a database device C;

FIG. 9D illustrates an example of the data registered to the database device A after being shuffled;

FIG. 9E illustrates an example of the data registered to the database device B after being shuffled;

FIG. 9F illustrates an example of the data registered to the database device C after being shuffled;

FIG. 10A illustrates an example of statistical information of the database device A;

FIG. 10B illustrates an example of statistical information of the database device B;

FIG. 10C illustrates an example of statistical information of the database device C;

FIG. 12 is a flowchart illustrating details of a schema creation process according to the embodiment;

FIG. 18 is a flowchart illustrating a data access process according to the embodiment; and FIG. 19 illustrates a configuration of an information processing device (computer).

DESCRIPTION OF EMBODIMENT

An embodiment according to the present invention is described below with reference to the drawings.

Figure 1:
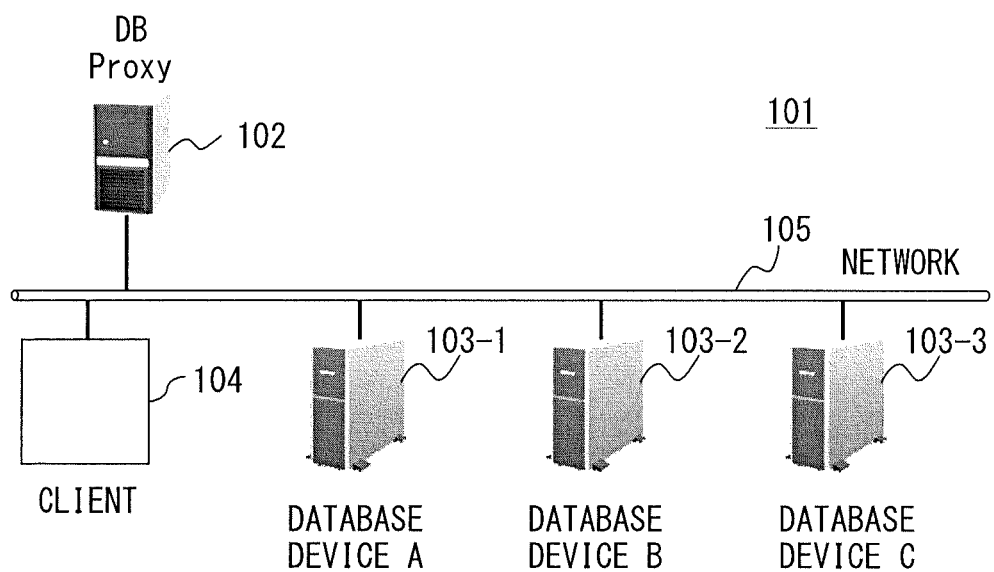
FIG. 1 illustrates a configuration of a database system according to an embodiment.

FIG. 1 illustrates a configuration of a database system according to the embodiment.

The database (DB) system 101 includes a DB Proxy 102, and database devices 103-n (n=1 to 3). The database devices 103-1, 103-2 and 103-3 are also referred to as database devices A, B and C, respectively.

The DB Proxy 102, the database devices 103-n and a client 104 are interconnected via a network 105.

The DB Proxy 102, for example, decides a data placement, and returns a search result to the database device 103.

Each of the database devices 103 stores data. Moreover, each of the database devices 103 collects information such as a data capacity, a frequency of an access to the data, and the like.

The client 104 makes a data registration, a search request or the like to the DB Proxy 102. Moreover, the client 104 receives process results such as a search result or the like from the DB Proxy 102.

Figure 2:
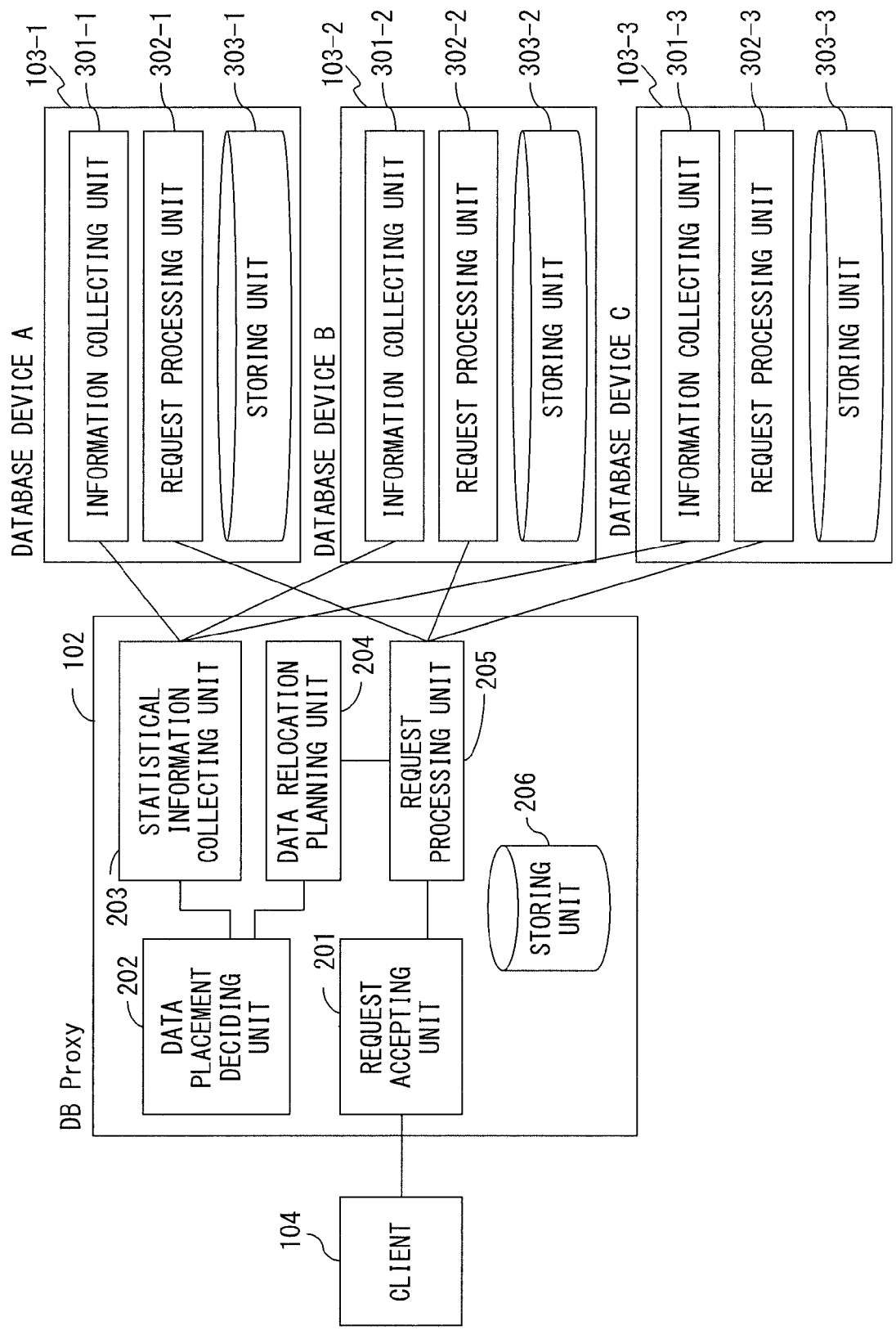
FIG. 2 illustrates details of the configuration of the database system according to the embodiment.

FIG. 2 illustrates details of the configuration of the database system.

The DB Proxy 102 includes a request accepting unit 201, a data placement deciding unit 202, a statistical information collecting unit 203, a data relocation planning unit 204, a request processing unit 205, and a storing unit 206.

The request accepting unit 201 receives a table creation request, a data registration request and the like from the client 104.

The data placement deciding unit 202 decides data to be placed in the database devices 103.

The statistical information collecting unit 203 collects statistical information such as an access frequency and the like of the database devices 103.

The data relocation planning unit 204 determines whether or not a data placement conforms to a data placement policy, and relocates data if the data placement does not conform to the data placement policy.

The request processing unit 205 issues a request such as schema creation, data registration or the like to the database devices 103.

The storing unit 206 stores information such as property information, data placement policies and the like of the database devices 103.

The database devices 103-n respectively includes an information collecting unit 301-n, a request processing unit 302-n and a storing unit 303-n.

The information collecting unit 301 counts a frequency of an access to data stored by the local database device 103, and the amount of stored data, and stores the access frequency and the amount of data in the storing unit 303 as statistical information.

The request processing unit 302 performs operations such as data transmission/reception, data storage and the like in response to a request issued from the client 104.

The storing unit 303 stores a table (database) where distributed data is written, and a schema indicating a structure of the table.

A data placement decision process and a data update process in this embodiment are described below.

Various items of information used in the processes executed in this embodiment are initially described before the processes of this embodiment are described.

FIG. 3 illustrates an example of database device property information.

The database device property information 401 is written by making an association between a name of a database device and properties of the database device. Contents of the properties include an operating rate, performance, cost, and a capacity.

The operating rate is a ratio of a total time to a time during which each of the database devices 103 is operating.

The performance is a value based on a processing speed, latency or the like of the database device 103.

The cost is an amount of money needed for a data amount.

The capacity is a maximum storage capacity of each of the database devices 103.

For example, in the database device property information 401 of FIG. 3, the operating rate, the performance, the cost and the maximum storage capacity of the database device A are 99.95 percent, 5, 0.20 GB per dollar and 100 GB, respectively.

The database device property information 401 is stored in the storing unit 206.

FIG. 4 illustrates an example of the data placement policies.

In the data placement policies 402, information (policies) indicating how to place data is written.

For example, in the data placement policies 402 of FIG. 4, "Creating a replica in a plurality of database devices if a database device having an operating rate lower than 99 percent is used). Namely, the policy of managing the same data by combining a plurality of database devices having an operating rate lower than 99 percent is written.

Additionally, in the data placement policies 402 of FIG. 4, "cost effectiveness" is written as a policy. Namely, the policy of deciding a data placement so that cost is reduced is written.

The data placement policies 402 are stored in the storing unit 206.

FIG. 5 illustrates an example of the schema.

The schema is, for example, an SQL (Structured Query Language) schema, and represents a structure of a database.

In the schema 403 of FIG. 5, data items (such as a client ID, a client name), data types of the data items (such as CHARACTER, DATE), and constraint conditions (such as UNIQUE, NOT NULL) are associated with one another and written.

The schema 403 is created, for example, with SQL similarly to conventional techniques.

In the embodiment, MUTEX(n) indicating an exclusive relationship is added as a constraint condition for data items that cannot be placed in the same database device. This constraint condition indicates that data items having the same key n are not placed in the same database device 103.

For example, in the schema 403 of FIG. 5, MUTEX(1) is written as a constraint condition for the client ID and the client name. This indicates that data of the client ID and the client name cannot be placed in the same database device 103.

Similarly, MUTEX(2) is written as a constraint condition for the birth date and the family structure. This constraint condition indicates that data of the birth date and the family structure cannot be placed in the same database device 103.

If there are data items that a user does not desire to place in the same database device 103, he or she writes MUTEX(n) as a constraint condition for the data items of the schema 403. As a result, the data items are not placed in the same database device 103 in a data distribution decision process to be described later.

For example, if MUTEX(n) is written to a data item that makes sense if it is combined, the data item is not placed in the same database device 103. Accordingly, even if data leaks out of one database device 103, the data stored in the database device 103 does not make sense alone, thereby improving security.

FIG. 6 illustrates an example of registration data.

The registration data 404 of FIG. 6 is data before being distributed to the database devices 103.

The registration data 404 includes, as data items, a client ID, a client name, a birth date, assets, a family structure, a premium, and a classification.

In the registration data 404, three pieces of data are written respectively for the data items.

Accordingly, the registration data 404 in the embodiment is data of 3 rows and 7 columns.

FIG. 7 illustrates an example of a column name association table.

The column name association table 405 of FIG. 7 is a table that represents an association between a data item name (column name) before being changed and a data item name (column name) after being changed. In the column name association table 405, the data item name before being changed and the data item name after being changed are associated with each other and written. A database name and a table name may be additionally written.

The column name association table 405 includes an original name and a name after being changed as items.

In the original name, a data item name (column name) before being changed is written.

In the name after being changed, a data item name (column name) after being changed is written. In the embodiment, a format of data written in the name after being changed is "database name.table name.data item name after being changed".

For example, in the column name association table 405, the client ID and A.Foo.B are associated with each other. This indicates that the client ID is written in a data item (column name) B of a table Foo in the database device A.

FIG. 8 illustrates an example of a row association table.

The row association table 406 of FIG. 8 is a table that represents an association among rows of tables of the database devices. In the row association table 406, keys assigned to the rows of the tables of the database devices are associated with one another and written.

In the row association table 406, the keys XYZ, 324 and w4t are associated with one another and written. This indicates that a row where XYZ of the table in the database device A is written, a row where 324 of the table in the database device B is written, and a row where w4t of the table in the database device C is written are associated with one another. Namely, the row association table 406 indicates that the data of the rows where these keys are respectively written are associated with one another.

Figure 9B:
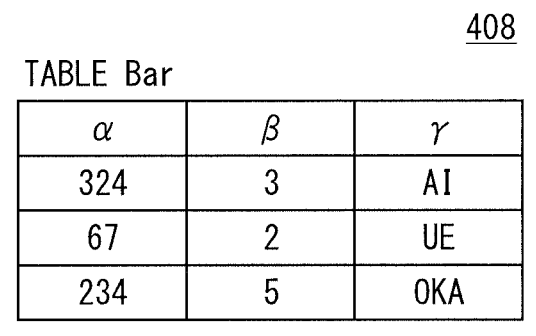

FIGS. 9A, 9B and 9C illustrate examples of data respectively registered to the database devices A, B and C.

The data of FIGS. 9A to 9C are data obtained by executing a data placement decision process in the embodiment, and by distributing and registering the registration data 404 of FIG. 6 to the database devices 103.

In the database devices A, B and C, the tables (referred to also as databases) respectively storing the data are assumed to be Foo 407, Bar 408 and Baz 409.

Figure 9E:
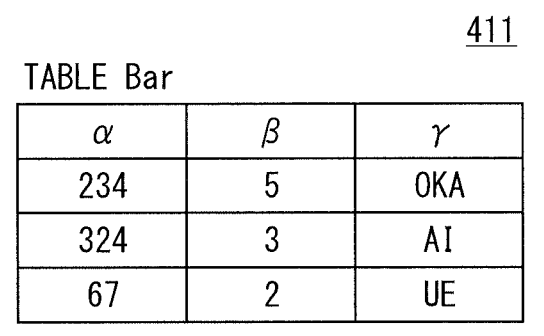

FIGS. 9D, 9E and 9F illustrate examples of the data respectively registered to the database devices A, B and C after being shuffled.

The data of FIGS. 9D, 9E and 9F are data obtained by shuffling (suitably interchanging) the rows of the data illustrated in FIGS. 9A, 9B and 9C.

In the database devices A, B and C, the tables respectively storing the data after being shuffled are assumed to be Foo 410, Bar 411 and Baz 412.

FIGS. 10A to 10C illustrate examples of statistical information.

FIGS. 10A, 10B and 10C respectively illustrate the statistical information of the database devices A, B and C.

The statistical information 413-n is stored in the storing unit 303-n.

The statistical information 413 stores information about the data registered to each of the database devices.

Specifically, in the statistical information 413, a column name of a table, an access frequency and a data amount are associated with one another and written.

The access frequency indicates a frequency of an access made to data of the column name.

The data amount is a size of the data of the column name.

For example, FIG. 10A indicates that data of a column name B is accessed by 500,000 times per day and the size of the data amount is 10 GB.

Processes executed by DB Proxy 102 and the database devices 103 in the embodiment are described below.

Figure 11:
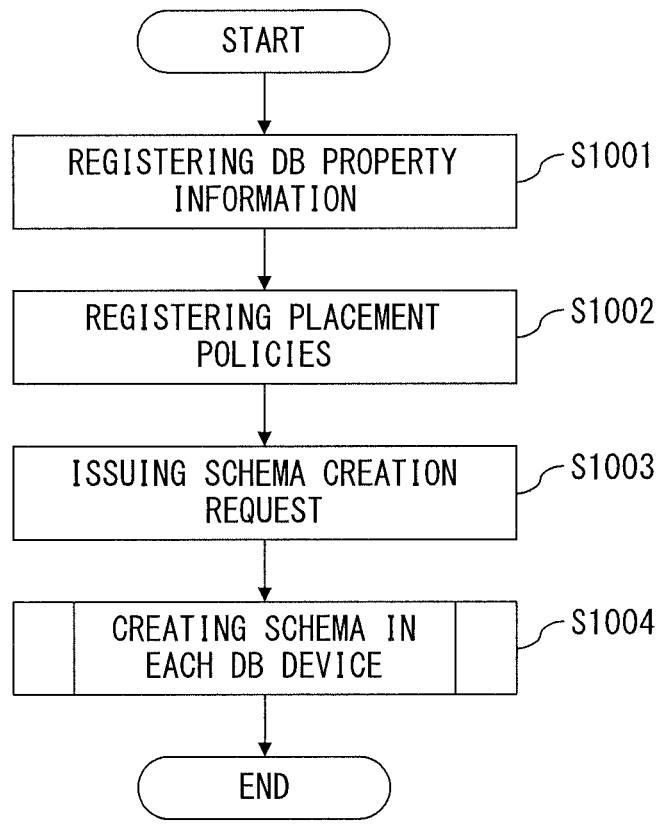
FIG. 11 is a flowchart illustrating a database setting process according to the embodiment.

FIG. 11 is a flowchart illustrating a database setting process according to the embodiment.

In step S1001, a user registers the database device property information 401 to the storing unit 206.

In step S1002, the user registers the data placement policies 402 to the storing unit 206.

In step S1003, the user issues a schema creation request from the client 104 to the DB Proxy 102. In the embodiment, the schema creation request includes the schema 403 illustrated in FIG. 5.

In step S1004, each of the database devices 103 creates a schema.

Details of the process in step S1004 will be described later.

FIG. 12 is a flowchart illustrating details of the schema creation process (step S1004) according to the embodiment.

In step S1101, the request accepting unit 201 receives the schema creation request from the client 104. The schema 403 included in the schema creation request is stored in the storing unit 206.

In step S1102, the data placement deciding unit 202 decides a data placement in each of the database devices 103.

Details of the data placement decision process executed in step S1102 will be described later.

In step S1103, the request processing unit 205 checks whether or not the request has been transmitted to all of database devices 103 to be used. If the request has been transmitted to all of the database devices 103 to be used, the process is terminated. If the request has not been transmitted to all of the database devices 103 to be used yet, a control goes to step S1104.

In step S1104, the request processing unit 205 generates a schema creation request based on the data placement and the column association table decided in step S1102, and transmits the request to the database device 103.

In step S1105, the database device 103 creates a schema based on the schema creation request.

Figure 13:
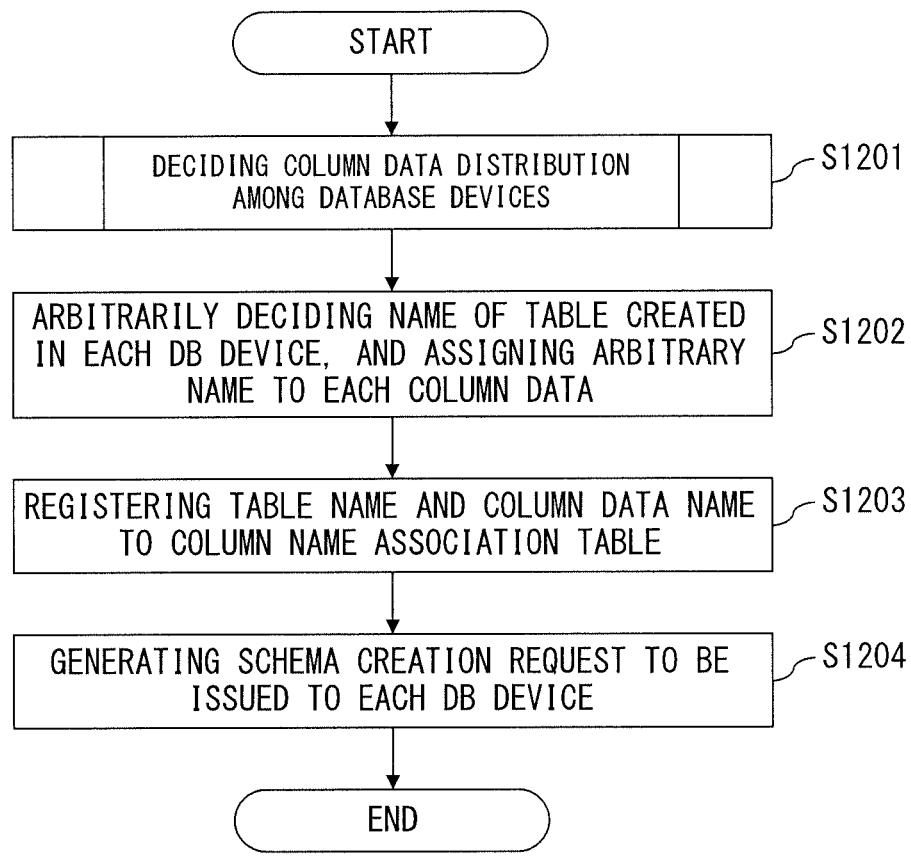
FIG. 13 is a flowchart illustrating details of a data placement decision process according to the embodiment.

FIG. 13 is a flowchart illustrating details of the data placement decision process (step S1102) according to the embodiment.

In step S1201, the data placement deciding unit 202 decides to distribute data items (column data) among the database devices.

Details of the column data distribution decision process will be described later.

This embodiment assumes that the client ID, the birth date, the assets, the premium, and the classification among the registration data 404 are decided to be placed in the database device A, and the client name and the family structure are decided to be placed in the database devices B and C.

In step S1202, the data placement deciding unit 202 arbitrarily decides a name of the table created in each of the database devices 103, and respectively assigns arbitrary names to the data items (column data names).

By respectively assigning the arbitrary names to the data items, what data means is not known even if the data leas out. As a result, security is improved.

This embodiment also assumes that the names of the tables created in the database devices A to C are Foo, Bar, and Baz, respectively.

This embodiment further assumes that the client ID, the birth date, the assets, the premium, and the classification are respectively B, C, D, E, and F in the table Foo, the client name and the family structure are respectively β and γ in the table Bar, and the client name and the family structure are respectively II and III in the table Baz.

In step S1203, the data placement deciding unit 202 registers the table names and the data item names, which are assigned in step S1202, to the column association table in the storing unit 206.

In the embodiment, the above described table names and data item names are registered, whereby the column association table 405 illustrated in FIG. 7 is generated.

In step S1204, the data placement deciding unit 202 references the column association table and generates a schema creation request to be issued to each of the database devices 103.

Figure 14:
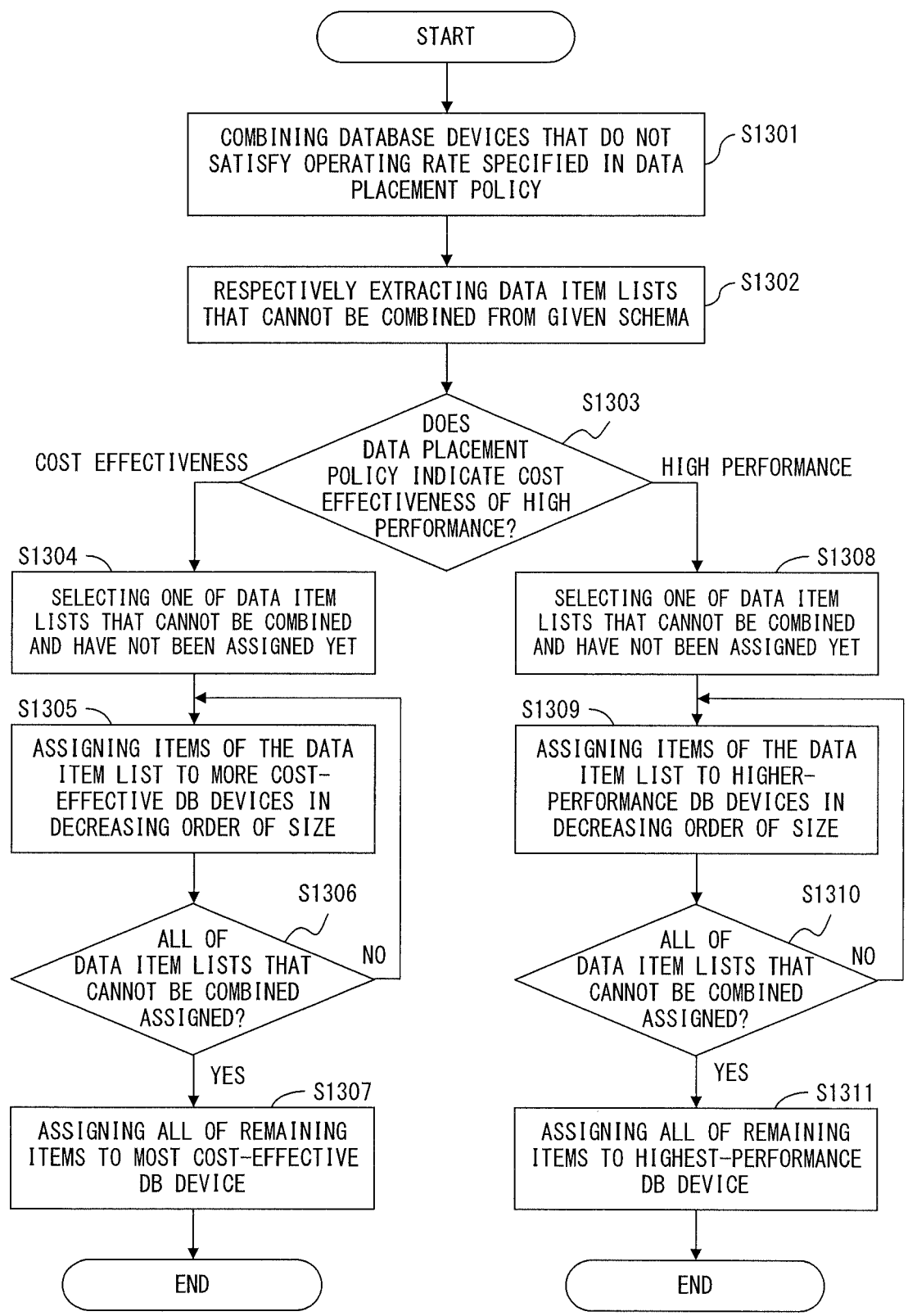
FIG. 14 is a flowchart illustrating details of a column data distribution decision process according to the embodiment.

FIG. 14 is a flowchart illustrating details of the column data distribution decision process (step S1201) according to the embodiment.

In step S1301, the data placement deciding unit 202 references the database device property information 401 and the data placement policies 402, and combines database devices 103 that do not satisfy an operating rate specified in a data placement policy 402 based on the database device property information 401 and the data placement policies 402.

In the embodiment, "creating a replica in a plurality of database devices if a database device having an operating rate lower than 99 percent is used" is written as a data placement policy 402. Namely, the policy of managing the same data by combining a plurality of database devices having the operating rate lower than 99 percent is written.

Additionally, with reference to the database device property information 401, the operating rates of the database devices A, B and C are 99.95 percent, 98.9 percent and 98.0 percent, respectively.

Accordingly, the database devices B and C having the operating rate lower than 99 percent are combined. Accordingly, a data placement is decided so that the data are distributed to the two database device A and (the database devices B and C) in the following process.

In step S1302, the data placement deciding unit 202 references the schema 403, and respectively extracts data items that cannot be combined among data items written in the schema 403.

In the embodiment, in the schema 403 of FIG. 5, MUTEX (1) is assigned, as an argument, to the client ID and the client name, and MUTEX (2) is assigned, as an argument, to the birth date and the family structure. Accordingly, the client ID and the client name, and the birth date and the family structure are extracted respectively as data item lists that cannot be combined.

In step S1303, the data placement deciding unit 202 references the data placement policies 402 to determine whether or not the data placement policy indicates either cost effectiveness or high performance. If the data placement policy indicates cost effectiveness, a control goes to step 1304. If the data placement policy indicates high performance, the control goes to step S1308.

For example, in the embodiment, cost effectiveness is written in the data placement policy 402 of FIG. 4. Therefore, the control goes to step S1304.

In step S1304, the data placement deciding unit 202 selects one of the data item lists that cannot be combined and have not been assigned yet.

For example, in the embodiment, the client ID and the client name are selected as data item lists that cannot be combined.

In step S1305, the data placement deciding unit 202 sequentially assigns the data items in the selected data item list that cannot be assigned to more cost-effective database devices 103 in decreasing order of size. The sizes are determined based on data types (such as CHARACTER, DATE, INTEGER or the like) written in the schema 403. If data types of the data items are the same, they are assigned in an arrangement order of an data item list that cannot be combined.

In the embodiment, when the client ID and the client name are assigned, the data types of the client ID and the client name are CHARACTER. Since the data types are the same, the client ID and the client name are assigned to the database devices 103 in this order.

In the embodiment, the database devices B and C are combined as described above in step S1301. Therefore, the data are assigned to the database device A and (the database devices B and C). If costs of the database device A and (the database devices B and C) are calculated by referencing the database device property information 401, the cost of the database device A is $0.20/GB, whereas that of the database devices B and C is $0.15/GB+$0.10/GB=$0.25/GB. Since the cost of the database device A is lower, the data are assigned to the database device A and (the database devices B and C) in this order.

In this way, the client ID is assigned to the database device A, and the client name is assigned to the database devices B and C.

Additionally, the data types of the birth date and the family structure are respectively DATE and INTEGER when they are assigned. Since the size of DATE is larger than that of INTEGER, the birth date and the family structure are assigned in this order.

Accordingly, the birth date is assigned to the database device A, and the family structure is assigned to the database devices B and C.

In step S1306, the data placement deciding unit 202 determines whether or not the data item lists that cannot be combined and have not been assigned yet have been assigned. If the data item lists have been assigned, the control goes to step S1307. If the data item lists have not been assigned yet, the control goes back to step S1305.

In step S1307, the data placement deciding unit 202 assigns the remaining data items to the most cost-effective database device.

In the embodiment, the cost of the database device A is lowest as described above. Therefore, the data items that have not been extracted in step S1302 (namely, the assets, the premium and the classification) are assigned to the database device A by referencing the schema 403.

In step S1308, the data placement deciding unit 202 references the schema 403 to respectively extract data items that cannot be combined among the data items written in the schema 403.

In the embodiment, MUTEX (1) is assigned, as an argument, to the client ID and the client name, and MUTEX (2) is assigned, as an argument, to the birth date and the family structure. Accordingly, the client ID and the client name, and the birth date and the family structure are extracted respectively as data item lists that cannot be combined.

In step S1309, the data placement deciding unit 202 sequentially assigns the data items in the selected data item list that cannot be combined to higher-performance data devices 103 in decreasing order of size. The sizes are determined based on the data types (such as CHARACTER, DATE, INTEGER or the like) written in the schema 403. If data types of the data items are the same, the data are assigned in an arrangement order of the data item lists that cannot be combined.

In the embodiment, when the client ID and the client name are assigned, the data types of the client ID and the client name are CHARACTER. Since the data types are the same, the client ID and the client name are assigned in this order.

In the embodiment, the database device B and the database device C are combined as described above in step S1301. Therefore, the data are assigned to the database device A and (the database devices B and C). If the performances of the database device A and (the database devices B and C) are respectively calculated by referencing the database device property information, the performance of the database device A is 5, and that of the database devices B and C is MIN (8, 10) =8. Therefore, the performance of (the database devices B and C) is higher. Accordingly, the data are assigned to (the database devices B and C) and the database device A in this order.

In this way, the client ID is assigned to (the database devices B and C), and the client name is assigned to the database device A.

Additionally, the data types of the birth date and the family structure are respectively DATE and INTEGER when the birth date and the family structure are assigned. Since the size of DATE is larger than that of INTEGER, the birth date and the family structure are assigned in this order.

Accordingly, the birth date is assigned to the database devices B and C, and the family structure is assigned to the database device A.

In step S1310, the data placement deciding unit 202 determines whether or not all of the data item lists that cannot be combined and have not been assigned yet have been assigned. If all of the item lists have been assigned, a control goes to step S1311. If the item lists have not been assigned yet, the control goes back to step S1309.

In step S1311, the data placement deciding unit 202 assigns the remaining data items to the highest-performance database device.

In the embodiment, the performance of the database devices B and C is highest as described above. Therefore, the data items that have not been extracted in step S1302 (namely, the assets, the premium, and the classification) are assigned to the database devices B and C by referencing the schema 403.

A process for registering data to the database devices 103 is described next. Assume that the above described database setting process has already been executed.

Figure 15:
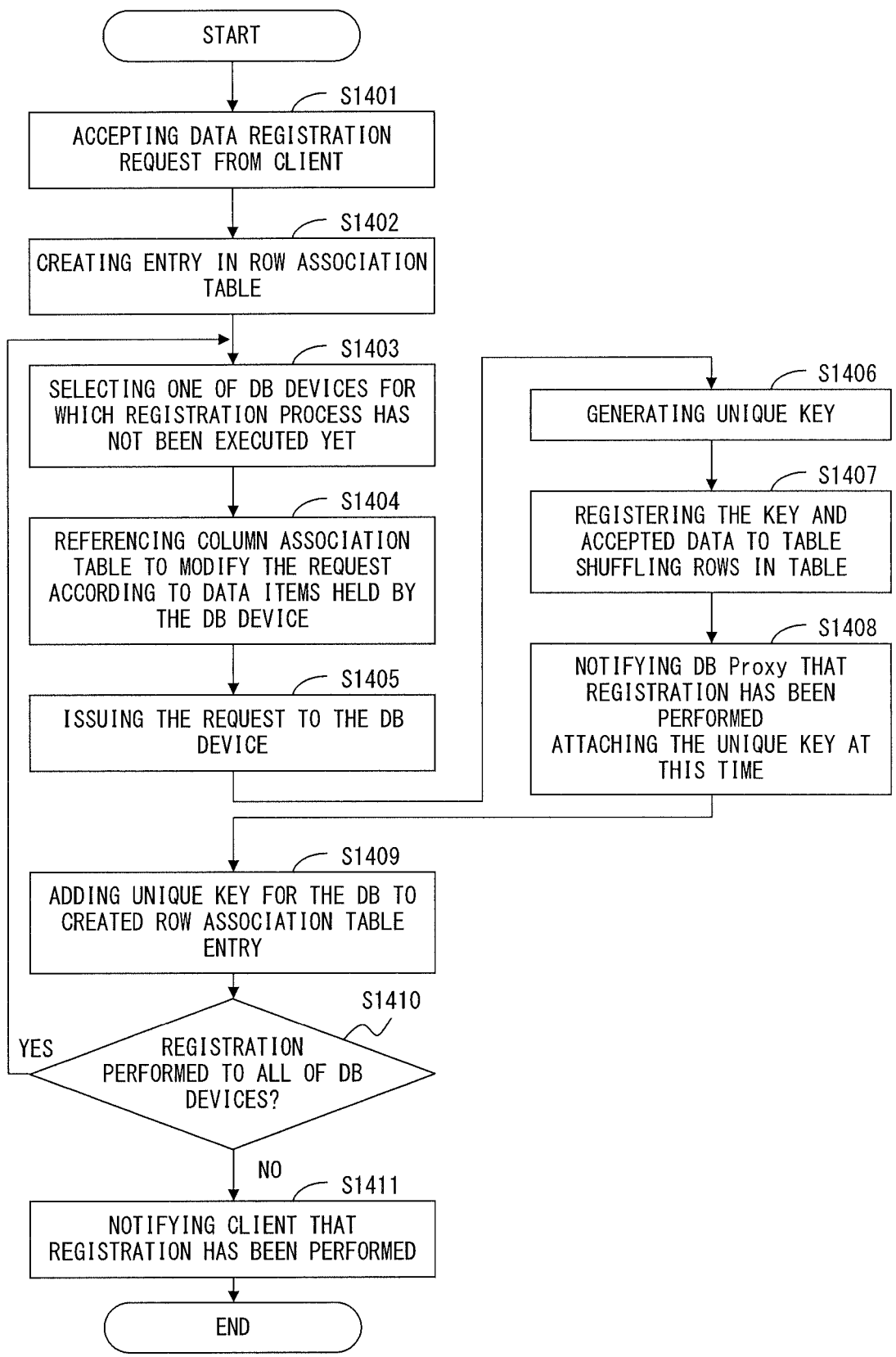
FIG. 15 is a flowchart illustrating a data registration process according to the embodiment.

FIG. 15 is a flowchart illustrating the data registration process according to the embodiment.

In the following process, steps S1401 to S1405, and steps S1409 to S1411 are executed by the DB Proxy 102, and steps S1406 to S1408 are executed by the database device 103.

In step S1401, the request processing unit 201 receives a data registration request from the client 104. The data registration request includes registration data 404, and a request itself to register the registration data 404.

In step S1402, the request processing unit 205 creates an entry for writing a unique key of each of the database devices 103 in the row association table 406.

In step S1403, the request processing unit 205 selects one of database devices 103 to which data has not been registered yet.

In step S1404, the request processing unit 205 modifies the data registration request according to data items held by the selected database device 103 with reference to the column name association table 405. The data registration request includes registration data to be registered to the selected database device 103, and a request itself to register the registration data.

For example, in the embodiment, with reference to the column name association table 405, the database device A holds, as registration data, a DB A key, the client ID, the birth date, the assets, the premium, and the classification. Moreover, in the database device A, the DB A key, the client ID, the birth date, the assets, the premium, and the classification are renamed to A, B, C, D, E, and F, respectively. Accordingly, the request processing unit 205 transmits the client ID, the birth date, the assets, the premium, and the classification among the registration data 404 to the database device A as registration data to be registered to the database device A. Moreover, the request processing unit 205 transmits a notification that the DB A key, the client ID, the birth date, the assets, the premium, and the classification are renamed to A, B, C, D, E, and F, and registered.

In step S1405, the request processing unit 205 transmits the data registration request to the selected database device 103.

In step S1406, the request processing unit 302 generates a unique key corresponding to each row of the received registration data. Note that a unique key of a database device X is referred to as a DB X key.

For example, in the embodiment, XYZ, AFG, and FRG are generated as unique keys (DB A keys) respectively corresponding to the first, the second, and the third rows of the registration data in the database device A.

In step S1407, the request processing unit 302 registers the unique keys and the received registration data to the table. Then, the rows of the data registered to the table are shuffled (suitably interchanged). As a result, the table where the rows of the data have been shuffled is arranged in the database device 103.

For example, in the embodiment, if the unique keys and the received data are registered to the table Foo in the database device A, the table Foo 407 illustrated in FIG. 9A is registered. Then, rows of the table Foo 407 are shuffled. For example, the second and the third rows in the table Foo 407 are interchanged.

As a result, the table Foo 410 illustrated in FIG. 9D is registered to the database device A.

Similarly, the table Bar 408 illustrated in FIG. 9B is registered in the database device B, and the table Baz 409 illustrated in FIG. 9C is registered in the database device C. Then, the rows are shuffled respectively in the database devices B and C, whereby the table Bar 411 illustrated in FIG. 9E is registered in the database device B, and the table Baz 412 illustrated in FIG. 9F is registered in the database device C.

In step S1408, the request processing unit 302 notifies the DB Proxy 102 that the data have been registered. At this time, the request processing unit 302 also transmits the unique keys generated in step S1406.

In step S1409, the request processing unit 205 registers the received unique keys to the row association table 406.

For example, in the embodiment, the request processing unit 205 writes the unique keys XYZ, AFG, and FRG received from the database device A in DB A key entries of the row association table 406.

In step S1410, the request processing unit 205 checks whether or not the data have been registered to all of the database devices 103. If the data have been registered, the control goes to step S1411. If the data have not been registered yet, the control goes back to step S1403.

In step S1411, the request accepting unit 201 notifies the client 104 that the data have been registered.

With the above described process, the data are distributed and registered to the respective database devices 103.

A process for dynamically changing a placement of data so that a set policy (such as cost effectiveness, high performance) is satisfied based on statistical information of the database device is described next.

Figure 16:
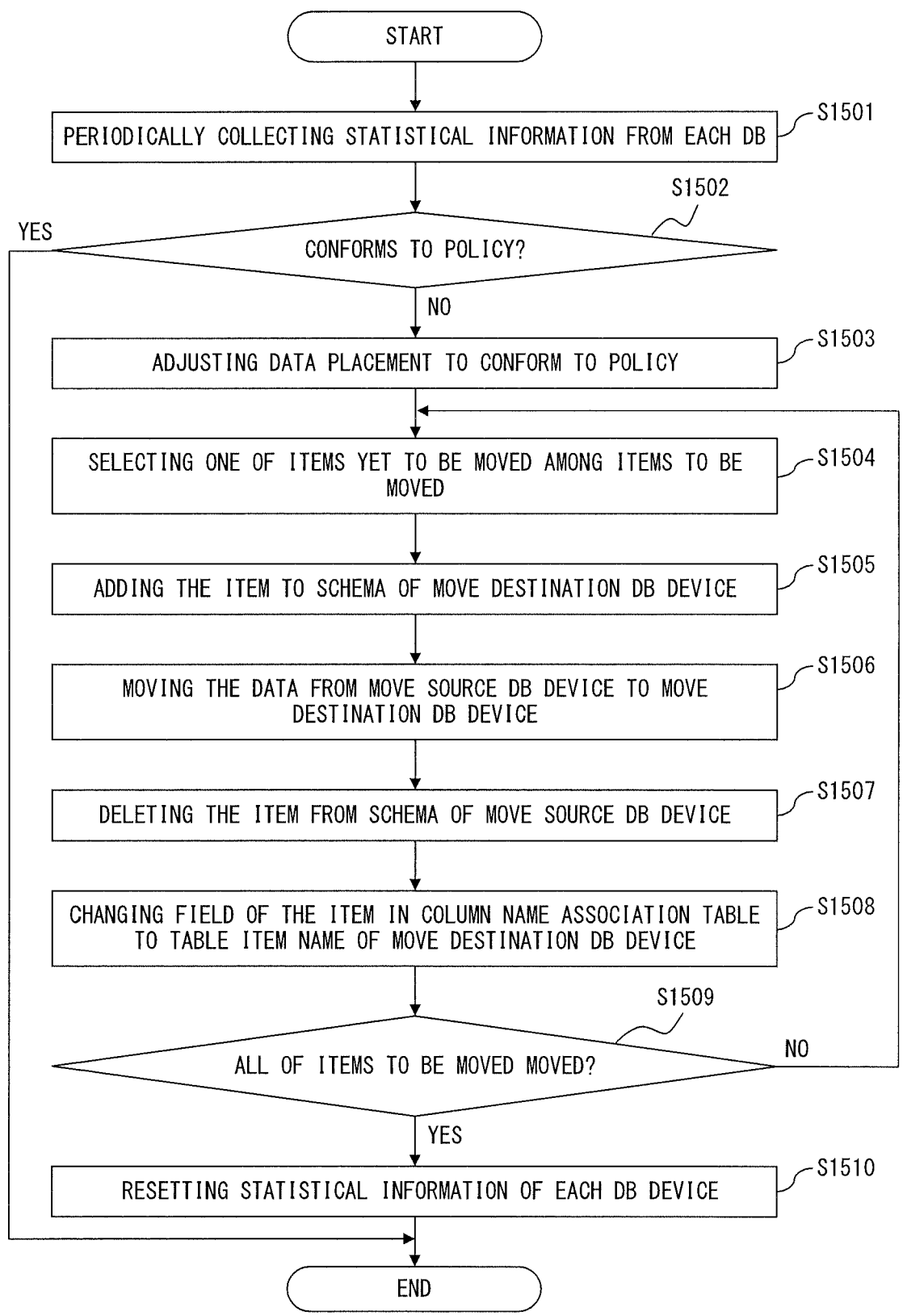
FIG. 16 is a flowchart illustrating a data relocation process according to the embodiment.

FIG. 16 is a flowchart illustrating the data placement change process according to the embodiment.

In step S1501, the statistical information collecting unit 203 periodically collects the statistical information 413 respectively from the database devices 103.

In the embodiment, the statistical information collecting unit 203 collects the statistical information 413-1, 413-2, and 413-3 respectively from the database devices A, B, and C. The collected statistical information 413 are stored in the storing unit 206.

In step S1502, the data relocation planning unit 204 determines whether or not the data placement conforms to any of the data placement policies 402 based on the collected statistical information 413. If the data placement conforms to the policy, the process is terminated. If the data placement does not conform to the policy, the control goes to step S1503.

Details of a process for determining whether or not the data placement conforms to the policy will be described later.

In step S1503, the data relocation planning unit 204 decides a data placement so that the data placement conforms to one of the data placement policies 402. At this time, the data placement is decided also in consideration of a constraint condition (exclusive information MUTEX) written in a schema. As a method for deciding a data placement, for example, a method for checking all of combinations of a data placement and for selecting a combination that satisfies a policy (such as cost effectiveness) and the constraint condition is selected.

Here, a data item the data of which is to be moved in order to relocate the data is referred to as an item to be moved.

In step S1504, the data relocation planning unit 204 selects one item yet to be moved among items to be moved.

In step S1505, the data relocation planning unit 204 instructs a move destination database device to add an item to be moved to a schema. The move destination database device adds the item to be moved to the schema.

In step S1506, the data relocation planning unit 204 instructs a move source database device to transmit data of the item to be moved to the move destination database device. The move source database device transmits the data of the item to be moved to the move destination database device upon receipt of the instruction. The move destination database device registers the data to the table upon receipt of the data.

In step S1507, the data relocation planning unit 204 instructs the move source database device to delete the item to be moved from the schema. The move source database device deletes the item to be moved from the schema.

In step S1508, the data relocation planning unit 204 changes the field of the name after being changed, which corresponds to the item to be moved in the column name association table 405, to "move destination database device name.move destination database device table name.data item name after being changed".

In step S1509, the data relocation planning unit 204 determines whether or not all of the items to be moved have been moved. If all of the items to be moved have been moved, a control goes to step S1510. If all of the items to be moved have not been moved yet, the control goes back to step S1504.

In step S1510, the data relocation planning unit 204 instructs the database devices 103 to initialize the statistical information 413. The database devices 103 respectively initialize the statistical information 413.

Figure 17:
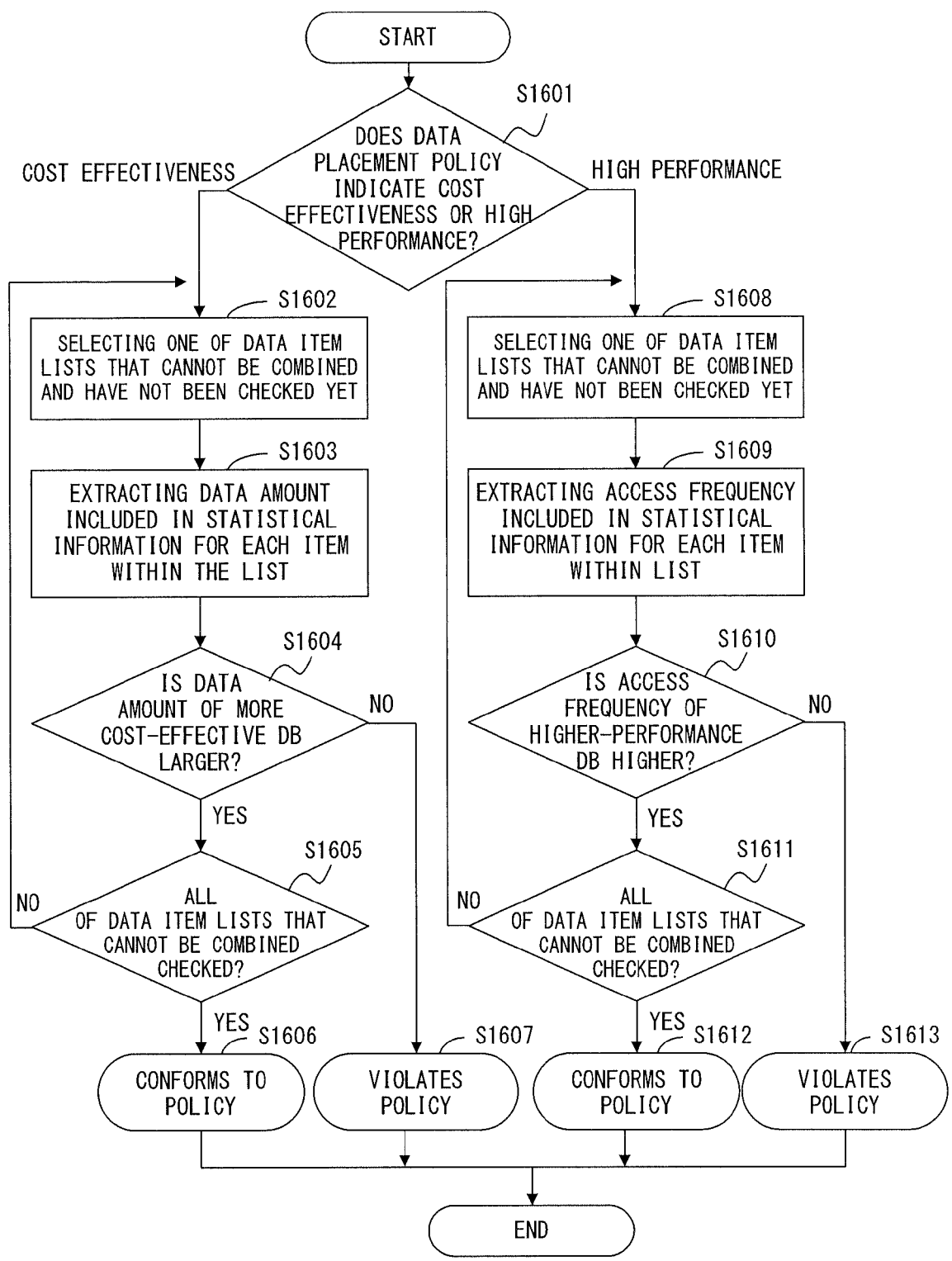
FIG. 17 is a flowchart illustrating details of a policy conformity determination process according to the embodiment.

FIG. 17 is a flowchart illustrating details of the policy conformity determination process (step S1502).

In step S1601, the data relocation planning unit 204 references the data placement policies 402 to determine whether one of them indicates either cost effectiveness or high performance. If the policy indicates cost effectiveness, the control goes to step S1602. If the policy indicates high performance, the control goes to step S1608.

In step S1602, the data relocation planning unit 204 selects one of data item lists that cannot be combined and have not been checked yet by referencing the schema 403.

For example, in the embodiment, the client ID and the client name are selected as data item lists that cannot be combined.

In step S1603, the data relocation planning unit 204 references the statistical information 413 to extract a data amount for each item of the data item list that cannot be combined and has been selected in step S1602. What a column name of the statistical information 413 means can be learned by referencing the column name association table 405.

In the embodiment, with reference to the statistical information 413, the data amount of the client ID (A.Foo.B) is 10 GB, and that of the client name (B.Bar. γ/C.BAZ.II) is 80 GB.

In step S1604, the data relocation planning unit 204 determines whether or not the data amount of one of the items, which has been extracted in step S1603 and registered to a more cost-effective database device 103, is larger than that registered to a less cost-effective database device 103. If the data amount registered to the more cost-effective database device 103 is larger than that registered to the less cost-effective database device 103, a control goes to step S1605. Alternatively, if the data amount registered to the more cost-effective database device 103 is smaller than that registered to the less cost-effective database device 103, the control goes to step S1607. The cost of each of the database devices can be determined by referencing the above described database device property information 401.

For example, in the embodiment, if the client ID and the client name are determined, the client name having a larger data amount is stored in the less cost-effective database devices B and C. Accordingly, this is determined to violate the policy.

In step S1605, the data relocation planning unit 204 determines whether or not all of the data item lists that cannot be combined have been checked. If all of the data item lists that cannot be combined have been checked, the control goes to step S1606. If all of the data item lists that cannot be checked have not been checked yet, the control goes back to step S1602.

In step S1606, the data relocation planning unit 204 determines that the data placement conforms to the data placement policy.

In step S1607, the data relocation planning unit 204 determines that the data placement does not conform to the data placement policy.

In step S1608, the data relocation planning unit 204 selects one of the data item lists that cannot be combined and have not been checked yet.

In the embodiment, the client ID and the client name are selected as data item lists that cannot be combined. Alternatively, the birth date and the family structure are selected as data item lists that cannot be combined.

In step S1609, the data relocation planning unit 204 extracts the access frequency of each of the items in the data item list that cannot be combined and has been selected in step S1602 by referencing the statistical information 413.

In the embodiment, with reference to the statistical information 413, the access frequency of the client ID (A.Foo.B) is 500,000 accesses per day, and that of the client name (B.Bar.γ/C.BAZ.II) is 800,000 accesses per day.

Additionally, the access frequency of the birth date (A.Foo.C) is 300,000 accesses per day, and that of the family structure (B.Bar. β/C.Baz.III) is 30,000 accesses per day.

In step S1610, the data relocation planning unit 204 determines whether or not the access frequency of one of the items, which has been extracted in step S1609 and registered to a higher-performance database device 103, is higher than that of the other item registered to a lower-performance database device 103. If the access frequency of the item registered to the higher-performance database device 103 is higher than that of the item registered to the lower-performance database device 103, the control goes to step S1611. Alternatively, if the access frequency of the item registered to the higher-performance database device 103 is lower than that of the item registered to the lower-performance database device 103, the control goes to step S1613. Note that the performance of each of the database devices 103 can be determined by referencing the above described database device property information 401.

In the embodiment, when the client ID and the client name are determined, the client name having a higher access frequency is stored in the higher-performance database devices B and C. Accordingly, this is determined to conform to the policy.

Additionally, when the birth date and the family structure are determined, the birth date having a higher access frequency is stored in the lower-performance database device A. Accordingly, this is determined to violate the policy.

In step S1611, the data relocation planning unit 204 determines whether or not all of the data item lists that cannot be combined have been checked. If all of the data item lists that cannot be combined have been checked, the control goes to step S1612. Alternatively, if all of the data item lists that cannot be combined have not been checked yet, the control goes back to step S1608.

In step S1612, the data relocation planning unit 204 determines that the data placement conforms to the data placement policy.

In step S1613, the data relocation planning unit 204 determines that the data placement does not conform to the data placement policy.

A process executed when the client accesses data is described next.

FIG. 18 is a flowchart illustrating the data access process according to the embodiment.

In step S1701, the request accepting unit 201 receives a data access request from the client 104. The data access request includes information such as a data item and the like requested by the client.

In step S1702, the request processing unit 205 decides an access destination database device by referencing the column association table 405. For example, if information of the client ID is requested, the database device A storing the client ID is decided as the access destination database device.

In step S1703, the request processing unit 205 references the column association table 405 to modify the request according to contents of data held by the access destination database device. For example, when the request processing unit 250 references the column association table 405 in the case of making a request of the client ID to the database device A, the client ID is renamed to the column name B in the database device A. Accordingly, the request processing unit 205 modifies the request in order to request data of the column name B.

In step S1704, the request processing unit 205 transmits the modified request to the access destination database device. The access destination database device transmits data according to the received request to the DB Proxy device 102 as a result of the request. The request processing unit 205 receives the result of the request.

For example, if the data of the column name B is requested, the access destination database device transmits the data of the column name B and a unique key corresponding to the data of the column name B to the DB Proxy device 102.

In step S1705, whether or not the request has been transmitted to all of database devices 103 to be used is determined. If the request has been transmitted to all of the database devices 103 to be used, a control goes to step S1706. If the request has not been transmitted to all of the database devices 103 to be used, the control goes back to step S1703.

In step S1706, the request processing unit 205 gathers the obtained data, and passes the data to the request accepting unit 201. The request accepting unit 201 transmits the received data to the client 104.

For example, in the database devices 103, rows of stored data are shuffled from original registration data and stored as described above. Accordingly, a plurality of pieces of data need to be combined so that they are suitably associated with one another.

For example, upon receipt of the data respectively from the database devices A, B, and C, the request processing unit 205 combines, as data to be transmitted to the client 104, data of the row corresponding to XYZ in the data received from the database device A, data of the row corresponding to 324 in the data received from the database device B, and data of the row corresponding to w4t in the data received from the database device C by making an association among these pieces of data with reference to the row association table 406. Similarly, data of the row corresponding to AFG, data of the row corresponding to 67, and data of the row corresponding to r5rty are associated with one another and combined as data to be transmitted to the client 104, and data of the row corresponding to FRG, data of the row corresponding to 234, and data of the row corresponding to asdf are associated with one another and combined as data to be transmitted to the client 104.

With the database system according to the embodiment, a constraint condition (MUTEX) specifying that data making sense if they are combined are not placed in the same database device is used to decide a data placement. As a result, data that make sense are not placed in the same database device. Accordingly, even if data leaks out of one database device, the data does not make sense alone. Consequently, security is improved.

Additionally, with the database system according to the embodiment, column names of each table are renamed.

Therefore, what data means is unknown even if it is viewed. As a result, security is improved.

Furthermore, with the database system according to the embodiment, rows of each table are shuffled. Accordingly, even if data leak out of a plurality of database devices, a combination of data cannot be learned. As a result, security is improved.

Still further, with the database system according to the embodiment, not a database device with high security but an arbitrary database device can be used, whereby cost can be reduced.

Still further, with the database system according to the embodiment, a data placement is decided based on properties or placement policies of each database device. As a result, a database system that meets user requirements such as cost effectiveness, high performance and the like can be built.

Still further, with the database system according to the embodiment, a data placement can be dynamically changed by using statistical information of data.

FIG. 19 illustrates a configuration of an information processing device (computer).

The DB Proxy 102 and the database device 103 in the embodiment are implemented, for example, with the information processing device 1 illustrated in FIG. 19.

The information processing device 1 includes a CPU 2, a memory 3, an input unit 4, an output unit 5, a storing unit 6, a recording medium driving unit 7 and a network connecting unit 8, which are interconnected by a bus 9.

The CPU 2 is a central processing unit that controls the whole of the information processing device 1. The CPU 2 corresponds to the request accepting unit 201, the data placement deciding unit 202, the statistical information collecting unit 203, the data relocation planning unit 204, the request processing unit 205, the information collecting unit 301 and the request processing unit 302.

The memory 3 is a memory such as a ROM (Read Only Memory), a RAM (Random Access Memory) or the like, which temporarily stores a program or data stored in the storing unit 6 (or on a portable recording medium 10) when the program is executed. The CPU 2 executes the above described various types of processes by executing the program with the memory 3.

In this case, a program code itself read from the portable recording medium 10 or the like implements the functions of the embodiment.

The input unit 4 is, for example, a keyboard, a mouse, a touch panel or the like.

The output unit 5 is, for example, a display, a printer or the like.

The storing unit 6 is, for example, a magnetic disk device, an optical disk device, a tape device or the like. The information processing device 1 stores the above described program and data in the storing unit 6, and reads and uses the program and data in the memory 3 as needed.

The memory 3 or the storing unit 6 corresponds to the storing unit 206 or 303.

The recording medium driving unit 7 drives the portable recording medium 10, and accesses its recorded contents. An arbitrary computer-readable non-transitory medium such as a memory card, a flexible disk, a CD-ROM (Compact Disk-Read Only Memory), an optical disk, a magneto-optical disk or the like is used as the portable recording medium. A user stores the above described program and data onto the portable recording medium 10, and reads and uses the program and data in the memory 3 as needed.

The network connecting unit 8 is connected to an arbitrary communication network such as a LAN or the like, and performs data conversion accompanying a communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substations, and alterations could be made hereto without departing from the spirit and scope of the invention.

What is claimed is:

1. A computer-readable, non-transitory medium storing a data distribution program for causing a computer to execute a process for distributing data table to a plurality of database devices, the process comprising:
    storing the data table in a storing unit, the data table including a plurality of data item groups, each of the plurality of data item groups including a plurality of pieces of data relating to a same data item of a plurality of records;
    reading, from the storing unit, exclusivity information about placement of the plurality of data item groups on the plurality of database devices;
    deciding database devices the plurality of data item groups, respectively, based on the exclusivity information; and
    transmitting the plurality of data item groups to the plurality of database devices, respectively, according to the deciding,
wherein the exclusivity information indicates that specified two or more data item groups among the plurality of data item groups are not placed in a same database device among the plurality of database devices.

2. The computer-readable, non-transitory medium according to claim 1, the process further comprising
    renaming the plurality of the data item groups.

3. The computer-readable, non-transitory medium according to claim 1, the process further comprising:
    reading, from the storing unit, property information indicating a property of each of the database devices, and a placement policy where the placement of the data item groups is written; and
    deciding the placement of the data item groups based on the property information and the placement policy.

4. The computer-readable, non-transitory medium according to claim 1, the process further comprising
    collecting statistical information indicating an access frequency and a data amount of each of the data item groups placed in the database device;
    determining, based on the property information and the statistical information, whether or not the placement of the data satisfies the policy; and
    deciding a relocation of the data item groups based on the property information, the statistical information and the policy if the policy is not satisfied.

5. A data distributing apparatus for distributing data table to a plurality of database devices, the data distributing apparatus comprising:
    a storing unit configured to store the data table and exclusivity information about placement of a plurality of data item groups on the plurality of data database devices, the data table including a plurality of data item groups, each of the plurality of data item groups including a plurality of pieces of data relating to a same data item of a plurality of records;

a placement deciding unit configured to decide database devices for the plurality of data item groups, respectively, based on the exclusivity information; and a request processing unit configured to transmit the plurality of data item groups to the plurality of data database devices, respectively, according to then deciding, wherein the exclusivity information indicates that specified two or more data item groups among the plurality of data item groups are not placed in a same database device among the plurality of database devices.

6. The data distributing apparatus according to claim 5, wherein the placement deciding unit renames the plurality of data item groups.

7. The data distributing apparatus according to claim 5, wherein the storing unit stores property information indicating a property of each of the database devices, and a placement policy where a placement of the data item groups is written, and the placement deciding unit decides the placement of the data item groups based on the property information and the placement policy.

8. The data distributing apparatus according to claim 5, further comprising:

a collecting unit configured to collect statistical information indicating an access frequency and a data amount of each of the data item groups placed in each of the database devices; and a relocation deciding unit configured to determine, based on the property information and the statistical information, whether or not the placement of the data satisfies the policy, and to decide a relocation of the data item groups based on the property information, the statistical information and the policy if the policy is not satisfied.

9. The computer-readable, non-transitory medium according to claim 2, the process further comprising:

reading, from the storing unit, property information indicating a property of each of the database devices, and a placement policy where the placement of the data item groups is written; and deciding the placement of the data item groups based on the property information and the placement policy.

10. The data distributing apparatus according to claim 6, wherein the storing unit stores property information indicating a property of each of the database devices, and a placement policy where a placement of the data item groups is written, and the placement deciding unit decides the placement of the data item groups based on the property information and the placement policy.

* * * * *

UNITED STATES PATENT AND TRADEMARK OFFICE
CERTIFICATE OF CORRECTION

PATENT NO. : 8,924,386 B2
APPLICATION NO. : 13/176969
DATED : December 30, 2014
INVENTOR(S) : Masazumi Matsubara et al.

It is certified that error appears in the above-identified patent and that said Letters Patent is hereby corrected as shown below:

In the Claims

Column 16, Line 32-33, In Claim 1, delete "the-deciding," and insert -- the deciding, --, therefor.
Column 16, Line 49, In Claim 4, delete "claim 1," and insert -- claim 3, --, therefor.
Column 17, Line 22, In Claim 8, delete "claim 5," and insert -- claim 7, --, therefor.

Signed and Sealed this
Fourth Day of August, 2015

Michelle K. Lee
*Director of the United States Patent and Trademark Office*